United States Patent [19]

Montean, Jr.

[11] Patent Number: 4,774,640
[45] Date of Patent: Sep. 27, 1988

[54] ILLUMINATING DEVICE FOR DETERMINING DIMENSIONAL INTEGRITY OF MATERIAL WORKING TOOLS

[76] Inventor: John Montean, Jr., 4731 Bailey Rd., North Olmsted, Ohio 44070

[21] Appl. No.: 30,469

[22] Filed: Mar. 26, 1987

[51] Int. Cl.$^4$ ............................................. F21V 33/00
[52] U.S. Cl. ...................................... 362/89; 362/32; 356/153; 356/399
[58] Field of Search ....................... 356/153, 372, 399; 362/89, 32

[56] References Cited

U.S. PATENT DOCUMENTS 3,023,663  3/1962  Meltzer ............................... 356/372

FOREIGN PATENT DOCUMENTS 316055  11/1919  Fed. Rep. of Germany ........ 362/89

Primary Examiner—Larry I. Schwartz
Attorney, Agent, or Firm—Watts, Hoffmann, Fisher & Heinke Co.

[57] ABSTRACT

An illuminating device for determining the dimensional integrity between a first and second material working tool including a light emitting element connected to a light transmitting element, the light transmitting element having angularly oriented light emitting surfaces for directing emitted light from the light emitting source element in a direction toward the first material working tool, and then through the second material working tool to give a substantially 360° reflected light illumination in a clearance area defined between the first and second material working tools.

11 Claims, 3 Drawing Sheets

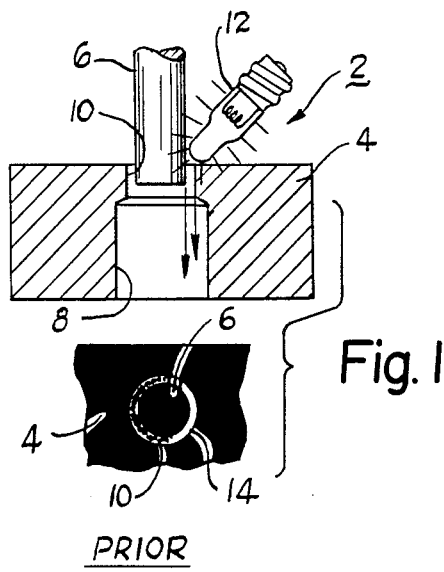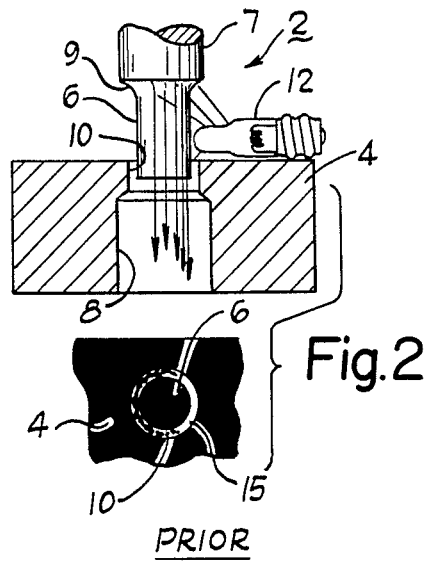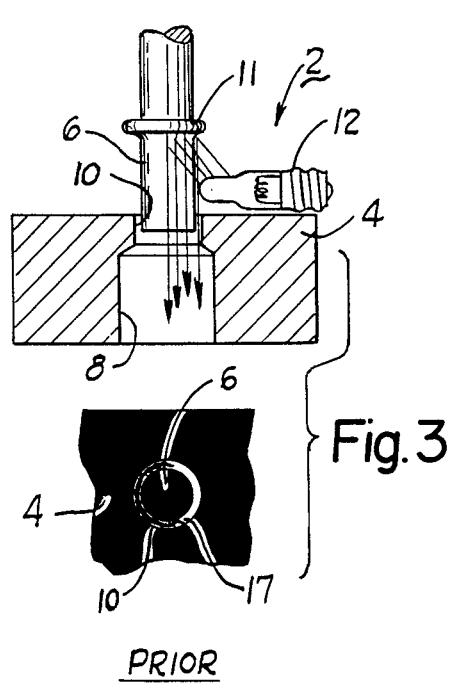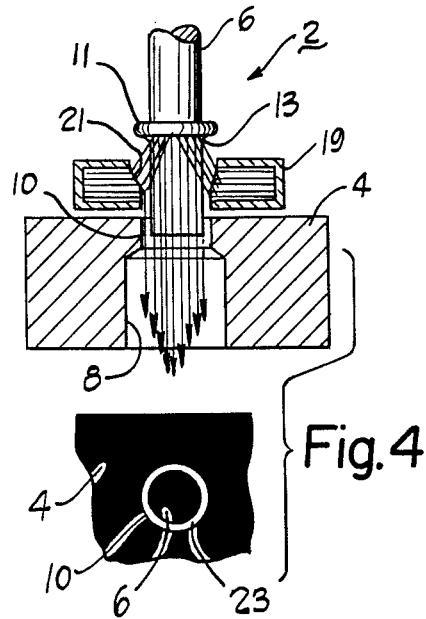

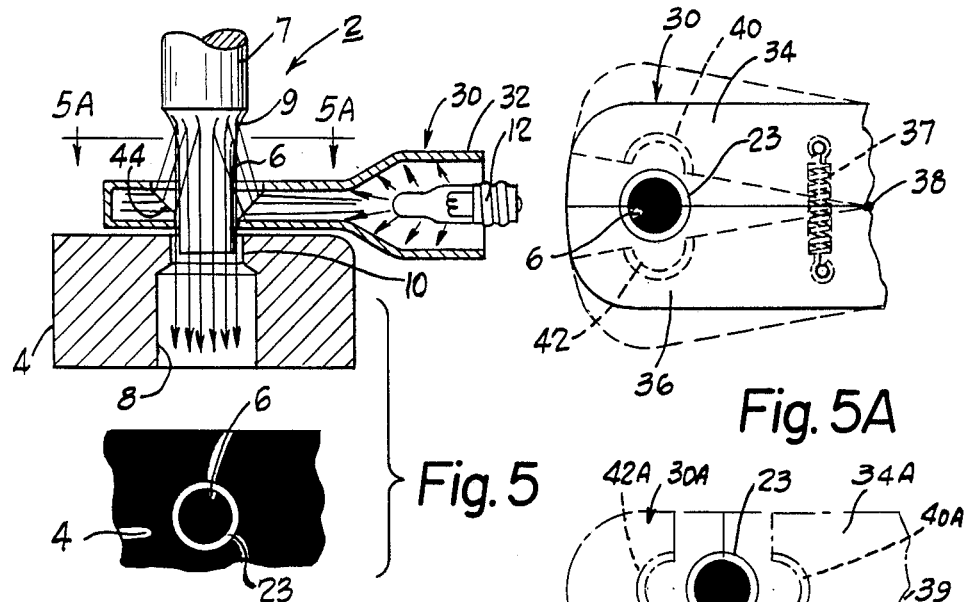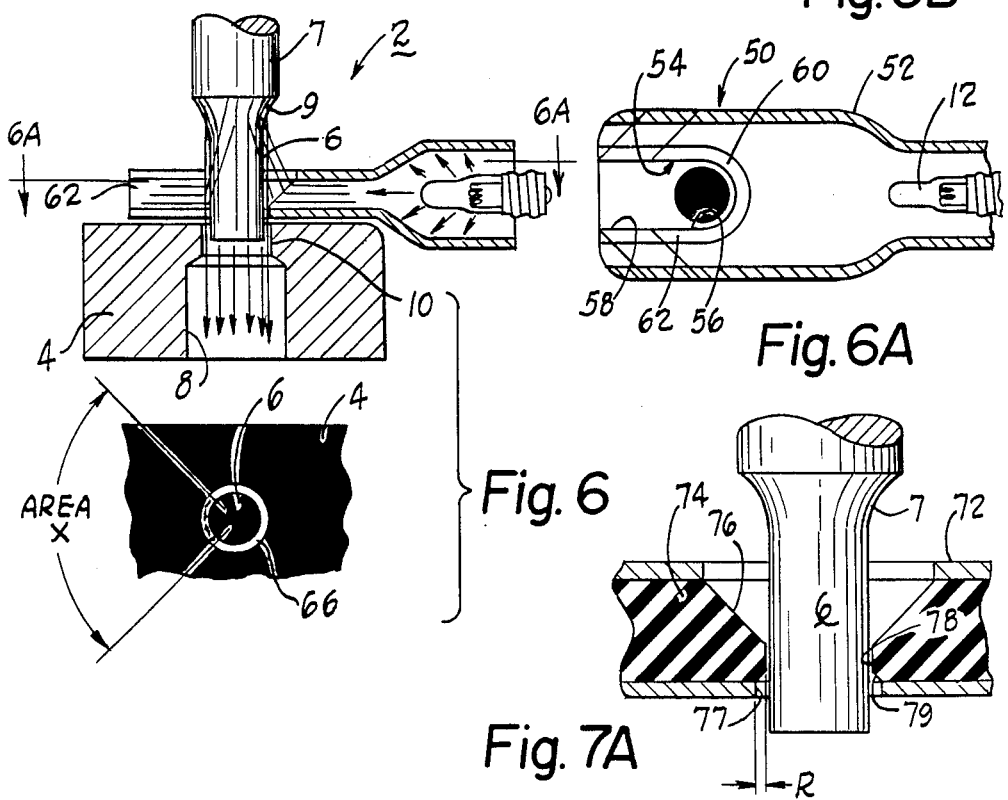

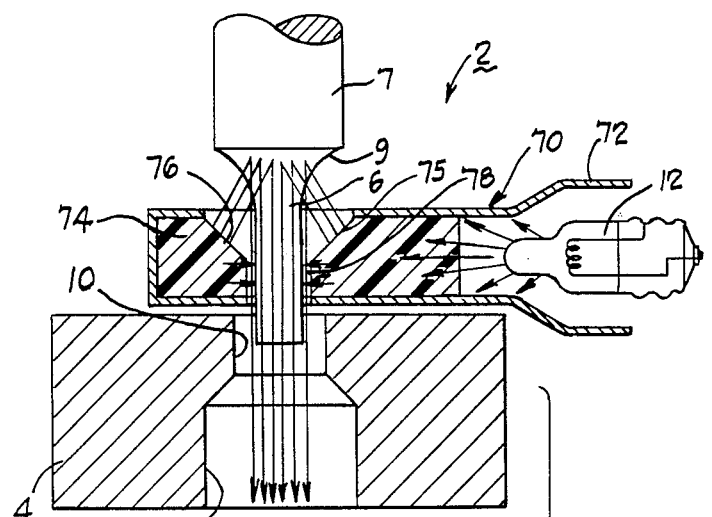
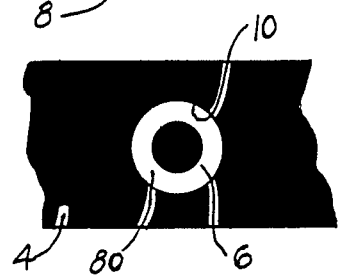
Fig. 7
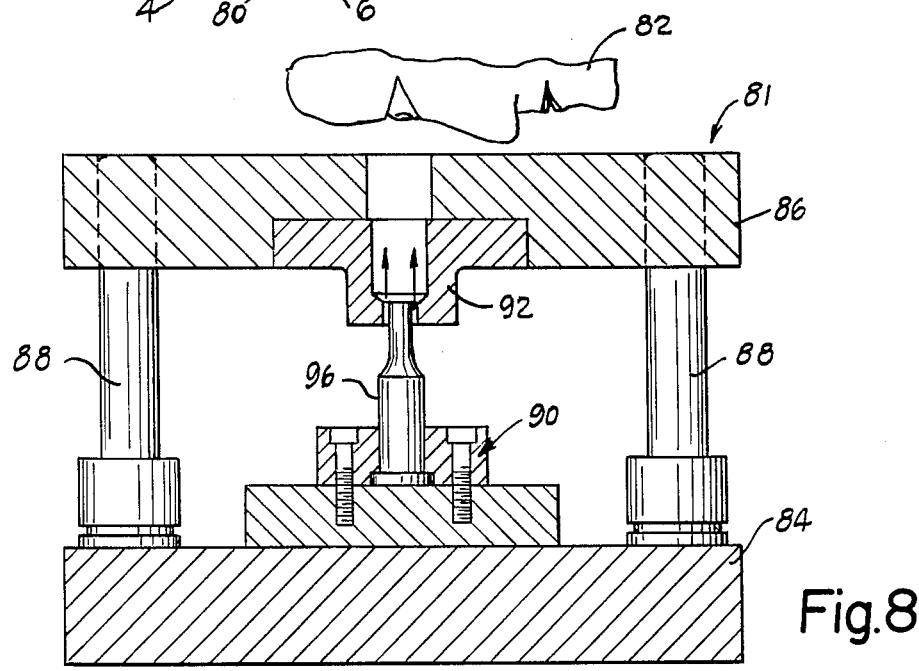
Fig. 8

ILLUMINATING DEVICE FOR DETERMINING DIMENSIONAL INTEGRITY OF MATERIAL WORKING TOOLS

DESCRIPTION

1 Technical Field

The present invention relates to the general field of measurement devices, and more particularly relates to an illumination device of the type for determining the dimensional integrity of material working tools. More specifically, the invention relates to a self-contained, or wired or fiber-optic illumination device for providing substantially 360° of light illumination so as to provide a readily visible indicia of determining the relative dimensional integrity between two material working tools. For example, such determination would be readily applicable for determining the relative concentricity or eccentricity between two metal working tools, such as a metal forming or piercing punch and its corresponding die block member. The invention has application for use with other materials such as plastic, wood or the like.

2. Background Art

Heretofore, it has been known to provide various types of illumination or light-source systems for determining and/or measuring the relative dimensional integrity between metal forming or working parts. Typically, these prior devices and/or systems have incorporated what might be referred to as a "single-point light source" wherein a single light, such as a bulb or a lamp, is manually positioned immediately next to and thereafter manipulated to visually inspect the clearance area between metal working tools, such as a metal punch and its corresponding die block. It has been found, however, that with such prior devices and/or systems that a single-point light source cannot provide a full and simultaneous 360° illumination and hence, cannot provide reliable and/or repeatable results. Further, such prior devices and/or systems not only require manual manipulation to make a 360° observation around the periphery of a tool, such as a metal punch, but also necessitate the operator's use of one or both hands to complete and repeat several times the determination. Accordingly, such prior devices and/or systems are not particularly satisfactory from an application and use point of view.

In addition, it has been found that prior devices and/or systems lack applications flexibility in that they do not lend themselves to use, with various sizes and/or shapes of metal forming or working tools. For example, when measuring the dimensional integrity between a metal working punch and its corresponding die block when the punch may have various size (diameter) requirements and/or cross-sectional configurations such as circular or non-circular (polygonal) configurations. Accordingly, as presently known such prior devices and/or systems do not provide for any ready interchangeability of minor component parts so as to expand and enhance the functions and capabilities of a single tool as does the present invention.

Though unavailable, it is thought that any other devices that might be constructed to provide a 360° illumination would be of a relatively complex and hence, expensive construction, and would not lend themselves to relatively inexpensive manufacture or produce relatively high efficiency and reliability with relatively unskilled labor requirements. Also, with the capability to use interchangeable inserts to provide the desired illumination for various sizes and/or shapes of metal working tool components, it is unnecessary to incur additional expense to maintain a separate inventory of various sizes and/or shapes of illumination devices. A further advantage of the present invention is that one does not have to open and close the die assembly to enter and extract the punches in and out of the die blocks as would be required by some 360° light source that was not "split" as is the present invention.

Other advantages and objects of the present invention will become apparent as the following description proceeds when taken in conjunction with the accompanying drawings. In such case, the drawings are indicative of the preferred embodiments and it is recognized that other equivalent embodiments of the invention are contemplated in the appended claims.

BRIEF DESCRIPTION OF THE DRAWINGS

FIG. 1 is a fragmentary, generally vertical section view (with end or underview below) illustrating a typical prior art die and punch assembly showing the disadvantages of the present typical single-point and tilted light source;

FIG. 2 is a fragmentary, generally vertical section view (with end or underview below) illustrating another typical prior art die and punch assembly showing the disadvantages of present single-point, non-tilted light source with a punch tool having a shouldered configuration;

FIG. 3 is a fragmentary, generally vertical section view (with end or underview below) illustrating another modified form of a punch and die assembly showing a special construction of a shouldered punch tool with a single-point light source;

FIG. 4 is a fragmentary, generally vertical section view (with end or underview below) of a typical punch and die assembly utilizing a 360° split-light source in accordance with the present invention in conjunction with a modified shoulder design on the punch tool;

FIG. 5 is a fragmentary, generally vertical section view (with end or underview below) of a punch and die assembly utilizing a 360° split-light source in accordance with the present invention;

FIG. 5A is a fragmentary, plan view looking in the direction of the line 5A—5A of FIG. 5 illustrating the hinge door pivoted construction for the split-light source;

FIG. 5B is a fragmentary, plan view illustrating another modification of the split-light source of the invention;

FIG. 6 is a fragmentary, generally vertical section (with end or underview below) of a punch and die assembly utilizing a 360° one-piece light source in accordance with the present invention;

FIG. 6A is a fragmentary, plan cross-section view looking in the direction of line 6A—6A of FIG. 6;

FIG. 7 is a fragmentary, generally vertical section view (with end or underview below) of a typical punch and die assembly with a 360° one-piece light source in accordance with the present invention;

FIG. 7A is a fragmentary, generally vertical section view showing a relief or clearance area between the punch and light source, and FIG. 8 is a typical die assembly in an upside down position with the eye of the user looking at the underside of the die and seeing what is shown in the "end or underviews" of FIGS. 1–7.

BEST MODE FOR CARRYING OUT THE INVENTION

Referring again to the drawings and in particular to FIG. 1 thereof, there is illustrated a typical die and punch assembly, designated generally at 2, incorporating a die block member 4 and a metal punch 6 of the type utilized for performing metal working operations or the like. The die member 4 has a typical countersunk opening, as at 8, with an entrance bore, as at 10, for receiving the transverse dimension of the punch member 6 therethrough. In the embodiment illustrated, a light source 12 which may be provided by any suitable light bulb or lamp construction that acts to transmit light rays directly onto the reflecting surfaces of the punch member 6 such that the light rays are deflected and transmitted generally vertically downwardly (in the direction of the arrows) so as to illuminate the clearance area, as at 14, defining the space between the confronting exterior surface of the punch 6 and the the interior confronting surface of the bore 10. In this embodiment, it will be noted that the exterior surface of the punch member 6 is smooth and uninterrupted, and the light source 12 is disposed at an angle, such as 45° or the like, to transmit the necessary light to define the clearance area 14. As noted hereinafter, this embodiment illustrates a single-point light source, and does not effectively provide an illumination sufficient to determine the true and accurate concentricity of the punch member 6 relative to the entry bore 10 into the die member 4.

In FIG. 2 there is illustrated a somewhat modified punch die assembly wherein like reference numerals designate like parts throughout. In this embodiment, it will be seen that the punch member 6 is provided with an enlarged diameter shank portion 7 that defines an annular radius or shoulder, as at 9, that is disposed in concentric relation relative to the portion 6. Also, in this embodiment the single light source, as at 12, is disposed at right angles relative to the longitudinal central axis of the punch member such that some emitted light rays are directed upwardly and generally vertically downwardly from both the shoulder portion 9 and also from the confronting exterior surfaces of the punch member (as shown by the arrows) in a downward direction through the bore 10. Accordingly, in this form it will be seen that the additional reflective surfaces provide a greater illumination so as to define the clearance area, as at 15, relative to the space between the exterior of the punch member and the interior of the bore 10. Here again, it will be seen that this type of illumination and light reflection does not provide a 360° illumination so as to determine the true and accurate concentricity of the relative axial alignment between the metal punch and die member.

In the embodiment illustrated in FIG. 3, there is illustrated a still further embodiment of a typical punch and die assembly, designated generally at 2, wherein like reference numerals designate like parts throughout. In this embodiment, a fabricated shoulder or ring portion, as at 11, is mounted on the punch member 6. In such case, this shoulder portion 11 may be a suitable O-ring which may be coated or made from an opaque white material or the like. In this form, it will be seen that the reflected light rays (as shown by the arrows) from the abutment ring 11, again as in FIG. 2, provide a somewhat greater illumination illustrated in the clearance area, as at 17, but not for a 360° illumination, as desired.

It has been found that the area 15 of FIG. 2 and area 17 of FIG. 3 will actually be clearer and better defined than area 14 of FIG. 1 wherein the punch has no shoulder.

Now in FIG. 4 there is illustrated one of the improved embodiments of the invention wherein like reference numerals refer to like parts throughout. In this embodiment, the punch member 6 is provided with the abutment ring 11 or shoulder 9 as in FIG. 2, and with the abutment ring being coated peripherally with a reflective material 13, such as a white opaque paint or the like. In this form, an illuminating device, as at 19, is provided so as to provide 360° illumination around the entire periphery of the metal punch member 6. In this form, the light source 19 may be provided with an inverted, truncated cone-shaped cavity defined by an endless, inclined lens surface 21 having a minimum diameter that is only slightly greater than that of the maximum corresponding diameter of the punch member, and that tapers upwardly and outwardly in a direction toward the abutment ring 11 or shoulder 9, as in FIG. 2. By this arrangement, the light rays are reflected angularly upwardly and inwardly so as to be reflected vertically downwardly from the reflective surface of the abutment ring or shoulder (in the direction of the arrows) so as to provide 360° illumination via the clearance area, as at 23, between the punch and die members for determining the true and accurate concentricity between these component parts. Accordingly, in this form it will be seen that the clearance area 23 is uniform for 360° and hence, can effectively determine concentricity, as compared to the clearance areas 14, 15 and 17 in FIGS. 1 through 3. If the shoulder were absent, it has been found that a good 360° effect is obtainable by pointing the cone downward.

In FIG. 5, there is illustrated a further modification of the invention wherein like reference numerals designate like parts throughout. In this form, a 360° light source device, designated generally at 30, is provided which has a hollow housing 32. The housing contains a suitable light source, such as a light bulb or the like, as at 12, and has a pair of integral, hollow arm members 34 and 36 (shown in FIG. 5A) that are pivoted about a vertical pivot connection, as at 38, in a clamp or clam-shell arrangement. As shown, the arm members 34 and 36 may be provided with oppositely disposed, semi-circular recesses 40 and 42 that when mated together define a circular configuration corresponding generally to the transverse configuration of the punch member 6. As illustrated in FIG. 5A, each of the semi-circular recesses is defined by an inverted, generally truncated semi-circular cavity defined by a sidewall which is endless when joined, as at 44, having a minimum transverse dimension slightly greater than that of the maximum transverse dimension of the punch member and extending angularly upwardly and outwardly in a direction toward the shoulder portion 9. This inclined construction acts to reflect the transmitted light rays upwardly toward the shoulder portion, whereupon, the light rays are reflected back and vertically downwardly (as shown by the arrows) so as to define the 360° clearance area, as at 23, between the punch and die members. In this form, the arm members 34 and 36 together with the housing 32 may be provided with a suitable light reflective coating, such as silver or the like, to prevent the light from being lost other than through the lens surface 44, in a manner as known in the art. The arm members 34 and 36 may be spring-biased via a spring, as at 37, so that the recess portions can be clamped around the punch for retaining the device in a self-supporting condition.

In FIG. 5B there is illustrated a further modified form of the invention wherein the like parts are designated by like reference numerals with the addition of the letter "A" reference. As shown, the clamp construction 30A, in this form, may include a slide arrangement wherein either arm 34A or 36A may slide axially relative to one another via guide pin element 39. Here, the semi-circular recesses 40A and 42A would be brought together to clamp around the punch 6 so as to reflect the transmitted light to define the clearance area 23 in the manner accomplished in the embodiment of FIG. 5, as aforesaid.

In FIG. 6, there is illustrated another embodiment of the invention wherein like reference numerals designate like parts throughout. In this embodiment, a 360° illuminating device, designated generally at 50, is provided in the form of a one-piece housing member 52 in the form of a tuning fork shape having a suitable lamp or bulb 12 mounted therein. In this form, the one-piece member 52 may be provided with a generally U-shaped opening 54 having a semi-circurlar end portion 56 and a linearly extending portion 58. The portions 56 and 58 are defined by downwardly inclined lens surfaces 60 and 62 for transmitting emitted light angularly upwardly toward the shoulder portion 9 and then downwardly and vertically (as shown by the arrows) to define the clearance area 66. However, in this form the emitted area, designated generally at X, of about 90° is somewhat darker in light intensity compared to the approximate 270° full illumination provided by the semi-circular lens surface 60. Moreover, while this particular one-piece, open-ended construction does not provide a 100% equal intensity of illumination as illustrated in FIGS. 4 and 5, it nevertheless has been found satisfactory for certain applications.

In FIG. 7, there is illustrated a further embodiment of the present invention wherein like reference numerals designate like parts throughout. This embodiment is generally similar to that illustrated in FIG. 5 but has been shown on a somewhat enlarged scale for purposes of clarity. As shown, the illuminating device, designated generally at 70, has a hollow casing or housing 72 made of metal that contains the light source via a bulb or lamp, as at 12. An integral (when joined) light transmitting body member of a solid construction 74 and made from a light transmitting glass or plastic material acts to transmit light from the source (as shown by the arrows) toward the punch member. The body member 74 may be provided with an inverted, generally frusto-conical cavity 76 defined by an endless, inclined light emitting lens surface for emitting light (in the direction of the arrows) upwardly and inwardly toward the abutment shoulder portion 9. The cavity 76 communicates with an axial passageway defined by an annular light emitting surface 78 for emitting light directly onto the confronting surface of the punch member, whereupon, all critical surfaces are light bathed permitting maximum transmission of reflected light downwardly to define the clearance area 80 between the component parts. This clearance area may be defined as a "space value" since it represents the relative concentricity in terms of an equal "thickness" band of light between the component parts.

In the invention, it will be recognized that inserts of an interchangeable and removable design may be provided, for example, in defining the semi-circular lens surfaces 40 and 42 in the embodiment of FIG. 5, and for the generally U-shaped configuration in FIG. 6. Accordingly, various sizes and/or configurations of lens surfaces may be provided to accommodate various sizes (diameters) of metal punch and/or for various non-circular (polygonal) configurations of punch, as desired. Also, it will be recognized that the 360° illuminating device of the invention can be designed so as to be quickly and easily clamped or otherwise removably affixed to the punch member or to the die member so as to be selfretaining. In this manner and as distinguished from the single-light source devices, the user need not manipulate the device to achieve a 360° measurement and hence, has his hands free to perform other operations, as desired.

In FIG. 7A, the casing 72 has been provided with an enlarged diameter opening, as at 77, to define a clearance or relief, as at R, relative to the punch to allow, in effect, a full "clearance-thickness" of light to be transmitted axially between the punch and die components. This is important so as to guard against the condition of eccentracity between the parts. In such case, it is also preferred that the light transmitting member 74 (plastic) be chamfered, as at 79, to accommodate this condition. This relief area and the light transmitting material 74 and casing in conjunction with the opening 77 insures good light transmission and affords a positive clamping of the illuminating device around the punch. It will be seen that the light transmitting material 74 may be readily sized and/or shaped to suit most any condition, as desired.

In FIG. 8, there is illustrated a typical die assembly, designated generally at 81, wherein like reference numerals refer to like parts throughout. In this form, the die assembly 81 has been reversed 180° to be in an upside down position to illustrate how the user, as at 82, sees the light source or illumination, as depicted in FIGS. 1 through 7, for example. Specifically, in all cases the punch is actually in a concentric position but the drawings have been shaded (in solid color) to illustrate the illumination effect provided by the present invention. Accordingly, in FIGS. 1, 2 and 3 the underview is illustrated in a shadowed manner due to all of the illumination coming from a single point of light. In contrast, FIGS. 4, 5 and 7 illustrate the 360° illumination as accomplished in the present invention.

Accordingly, in FIG. 8 there is illustrated upper and lower platen members 84 and 86 with the upper platen being movable relative to the lower platen via guide pins, as at 88, with the die block 92 and punch holder 90 being mounted for relative movement in respect to the punch member 96, as known in the art. As shown, the arrows depict the direction of the light source in accordance with the invention and as observed by the user looking in a direction toward the underside of the die block that receives the punch member.

Other advantages and objects of the present invention will become apparent when taken in conjunction with the accompanying claims.

I claim:

1. An illuminating device of the type for determining the dimensional integrity between a first and second material working tool, said material working tools disposed in coaxial relationship and being adapted to be at least partially nested relative to one another so as to define a generally endless annular clearance area between such coaxially aligned tools, the illuminating device comprising a body member having an opening for surrounding one of said working tools therein, said body member including a light emitting source means operably connected to a light transmitting means, said light transmitting source means having angularly oriented light emitting surfaces adapted for directing emitted light from said light emitting source means in a direction toward said first material working tool and then through said second material working tool so as to give a substantially 360° reflected light transmission through said clearance area defined between said first and second material working tools.

2. An illuminating device in accordance with claim 1, wherein said illuminating device includes at least a pair of pivotal arm means, each of said arm means having a generally circular recess portion corresponding in transverse cross-section to said first mentioned material working tool, and in the closed mating position adapted to provide substantially 360° illumination around the periphery of said first mentioned material working tool.

3. An illuminating device in accordance with claim 1, wherein said illuminating device includes a one-piece construction having a light transmitting body member, said body member having a light source at one end and at its other end having an open-ended, generally U-shaped construction, said U-shaped construction defined by an inclined light emitting lens surface, said lens surface having a generally U-shaped closed end portion and a linearly extending open-end portion, and said U-shaped portion corresponding generally in transverse cross-section to the corresponding cross-section of said first mentioned material working tool.

4. An illuminating device in accordance with claim 1, wherein said material working tool includes a material working punch member and a metal working die member, said die member having a die opening formed therein and having a transverse configuration corresponding to that of said punch member for forming a work piece.

5. An illuminating device in accordance with claim 1, wherein said device is adapted to be detachably mounted to said first or second material working tool.

6. An illuminating device in accordance with claim 1, wherein said first material working tool includes a metal punch and said second material working tool includes a metal die, and said metal die having an axial opening with said punch and die being disposed in a coaxially oriented relationship defining said endless clearance area therebetween and with said punch being adapted to be partially inserted in the opening in said die.

7. An illuminating device of the type for determining the relative uniformity between two or more material working tools which are disposed in a substantially coaxial and at least partially nested relationship so as to define an endless clearance space therebetween, said illumination device being of a portable, self-contained construction including a body member having an opening adapted to receive in surrounding relation one of said material working tools therein, said body member having a light illumination means at one end and at its opposite end having at least a pair of oppositely disposed moveable clamp-like arm means for movement toward and away from one another, each of said arm having a mating, generally semi-circular recess portion, said recess portions being of a correspondingly shaped mating configuration and having light transmitting and emitting lens means adapted for transmitting light from said illumination source through said body member in a direction toward one of said material working tools, and in the closed position said light transmitting and emitting lens means being disposed so as to provide 360° illumination around the exterior periphery of the associated material working tool in said clearance area to enable visual determination of the dimensional relationship between said material working tools.

8. An illuminating device in accordance with claim 1, wherein said devices includes an illuminating body member made from a polymeric material, said body member having a generally inverted conical cavity terminating in a generally circular opening adapted for axial registration with a bore provided in one of said material working tools.

9. An illuminating device in accordance with claim 8, wherein said illuminating material is chamfered below said opening therein to provide a light transmitting relief area in respect to one of said material working tools.

10. An illuminating device in accordance with claim 8, wherein said conical cavity defines a light reflective surface for reflecting light outwardly onto one of said material working tools for a secondary reflection in the opposite direction and generally parallel to a longitudinal axis of said coaxially aligned material working tools.

11. An illuminating device in accordance with claim 1, wherein said device includes a pair of arm members, and one of said arm members being movable relative to the other arm member for clamping engagement around one of said material working tools.

* * * * *